United States Patent Office 3,255,867
Patented June 14, 1966

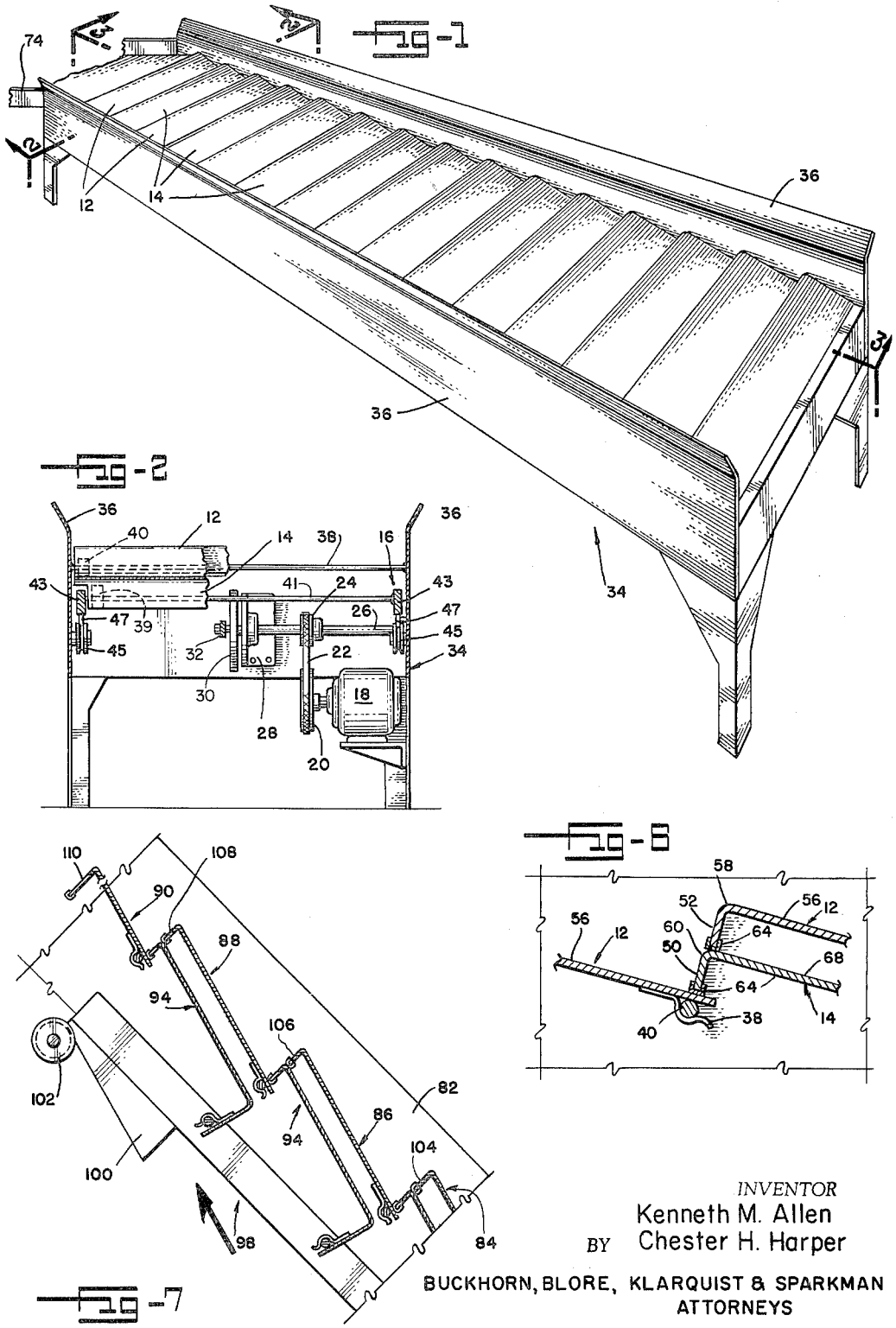

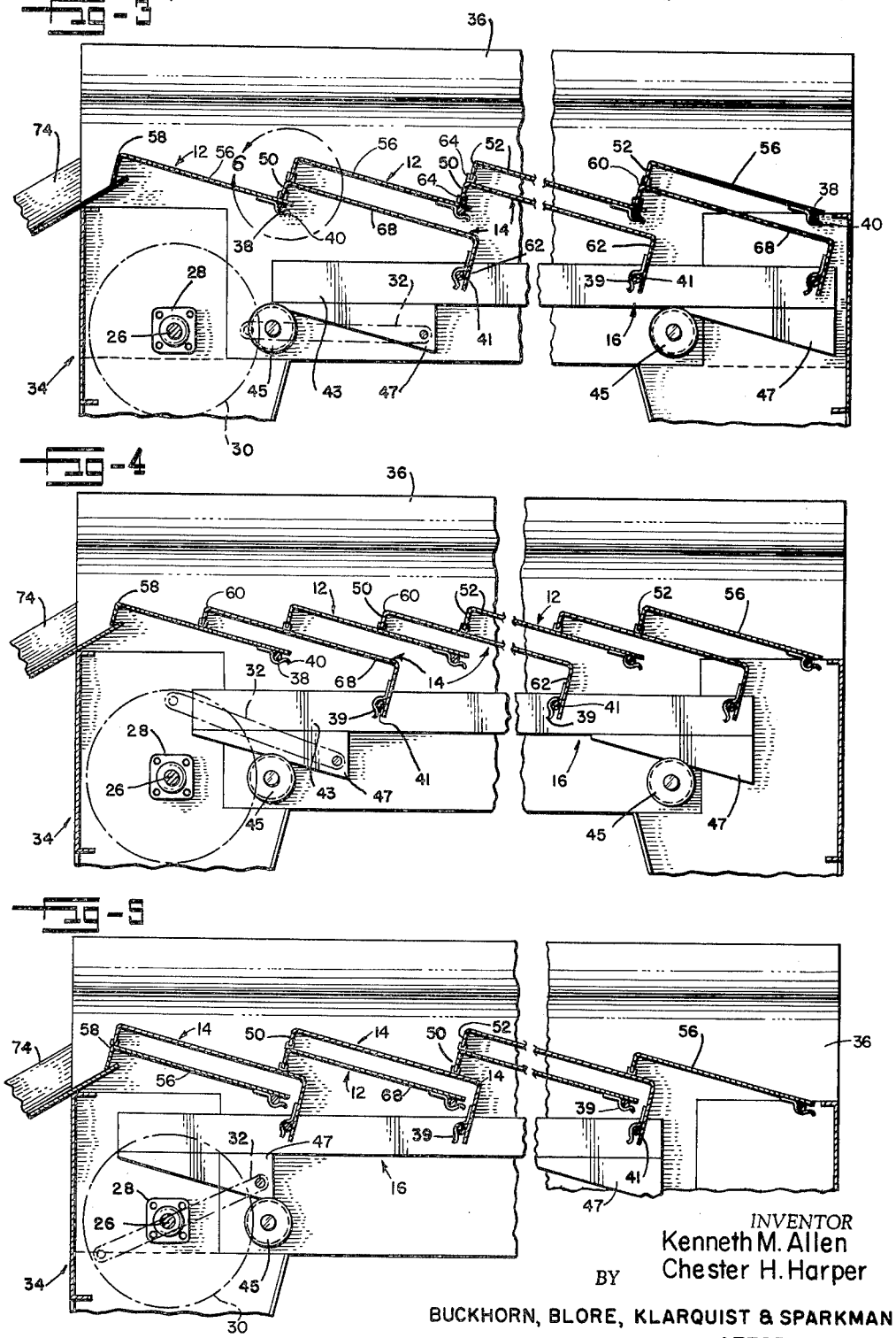

3,255,867
PUSHER CONVEYORS
Kenneth M. Allen and Chester H. Harper, both of
P.O. Box 352, Newberg, Oreg.
Filed Feb. 11, 1964, Ser. No. 344,052
8 Claims. (Cl. 198—221)

This invention relates to pusher conveyors, and more particularly to pusher conveyors for conveying articles therealong in steps for sorting the articles.

In culling articles such as, for example, potatoes, it is desirable to have all portions of each article brought at one time or another to a position visible to an inspector so that defective articles can be removed from the others. It would be desirable to provide conveyors having pushing elements for rolling an article in steps to sequentially move all portions of the article to the uppermost positions and providing pauses sufficient for an inspector to inspect the upper portions of the article. It would also be desirable to have the pushing elements quickly and easily removable from the conveyors, and to provide a conveyor adapted to both roll articles in steps for inspection and to automatically grade the articles according to size.

An object of this invention is to provide new and improved pusher conveyors.

Another object of the invention is to provide pusher conveyors for conveying articles therealong in steps, sorting articles.

A further object of the invention is to provide conveyors for rolling articles such as, for example, potatoes, in a series of steps to present different portions of the articles uppermost for inspection thereof.

Yet another object of the invention is to provide a pusher conveyor including a plurality of formed, removable plates arranged in shingle-like, interleaving positions with intermediate ones of the plates reciprocated relative to the other plates to advance articles therealong.

A still further object of the invention is to provide a pusher conveyor having a plurality of simple, easily formed, easily removable pushing and holding plates capable of being formed from sheet metal.

Another object of the invention is to provide a pusher conveyor having interleaved pushing plates and holding plates having grading openings therein.

The present invention provides pusher conveyors each including a plurality of interleaved plates with means for reciprocating alternate ones of the plates relative to the other plates to move articles step by step therealong. Preferably each conveyor includes a plurality of angular, downwardly facing plates mounted in interleaving positions and secured detachably by spring clips alternately to a fixed member and a reciprocated bar. In a conveyor forming one specific embodiment of the invention, alternate ones of the plates are provided with openings of a size permitting smaller articles to move therethrough and thus be separated from the larger articles.

A complete understanding of the invention may be obtained from the following detailed description of pusher conveyors forming specific embodiments thereof, when read in conjunction with the appended drawings, in which:

FIG. 1 is a fragmentary, perspective view of a pusher conveyor forming one embodiment of the invention;

FIG. 2 is an enlarged vertical sectional view taken along line 2—2 of FIG. 1;

FIGURES 3, 4 and 5 are enlarged, fragmentary, vertical sectional views of the pusher conveyor of FIG. 1 with parts thereof in different positions and taken substantially along line 3—3 of FIG. 1;

FIG. 6 is an enlarged, fragmentary, vertical sectional view of the portion of the conveyor enclosed in the circle designated by the numeral 6 in FIG. 3; and FIG. 7 is a fragmentary, vertical sectional view of a pusher conveyor forming an alternate embodiment of the invention.

Referring now in detail to the drawings, a pusher conveyor shown in FIGS. 1 to 6 includes angular holding plates 12 arranged in series and having interleaved therewith in a shingle-like arrangement generally channel-like pushing plates 14, which are reciprocated between retracted positions shown in FIG. 3 and extended or forward positions shown in FIG. 5 by a ladder-like drive frame 16 driven by an electric motor 18 (FIG. 2), pulley 20, belt 22, pulley 24, shaft 26 journaled in bearings 28, crank disc 30 and link 32. Side guide members 36 form a portion of fixed conveyor frame 34 in positions bracketing the plates 12 and 14. The plates 12 are pivotally supported at the righthand ends thereof, as viewed in FIG. 3, by rods 38 fixed to members 36, spring clips 40 serving to fasten the plates 12 to the rods 38 for quick attachment to and detachment from the rods. The righthand end of each plate 14 is detachably secured by clips 39 to a rod 41 fixed to bars 43 of the drive frame 16. While each plate 12 and 14 is illustrated herein as being supported by two or more separate clips 40 or 39, each plate can obviously be supported by a single clip similar to the clips 39 and 40 but being of a width extending almost the entire width of the plates 12 and 14. Pairs of grooved guide rollers 45 carried by the members 36 guide pairs of identical wedges 47 fixed rigidly to the bottom edges of the bars 43 and support the drive frame 16.

As the drive frame 16 is reciprocated between its lower, retracted position shown in FIG. 3 and its upper, forward position shown in FIG. 5, the plates 14 are moved from positions in which forward flanges 50 thereof are almost directly below forward flanges 52 of the holding plates 12 immediately to the rear or to the right of each plate 14, to extended positions in which the forward flanges 50 of the plates 14 are positioned substantially directly above the forward flanges 52 of the plates 12. The forward flanges 50 slide rounded articles up along base portions 56 of the plates 12 and then over rounded corners 58 of the holding plates 12, and roll the articles downwardly to positions resting against the forward flange 52 of the holding plate 12 positioned in front of the pusher plate 14 which has just pushed the article forwardly. This rolls each article about a quarter of a turn so that quadrants of the exterior surface of the article are sequentially positioned uppermost in four steps as the articles are rolled along the conveyor and advanced toward the left, as viewed in FIGS. 3, 4 and 5. As the pushing plates 14 are retracted, the articles are held against retraction by the forward flanges 52 and corners 58 of the holding plates, and when the plates 14 are fully retracted to the positions shown in FIG. 3, the articles roll over the corner portions 60 of the pushing plates 14 and then are pushed again to the left and rolled another quarter of a turn.

Since the plates 14 are driven by a crank motion there is a pause at the extremes of the movement of the plates 14 which allows an inspector to look at the uppermost portions of the article to determine whether or not it has defective portions and should be removed from the other articles. Thus, the conveyor of FIG. 1 is excellent for inspection and culling operations, as well as being an excellent, easily cleaned device for feeding fragile articles gently from one place to another. The holding plates 12 and the pushing plates 14 are generally similar, except that the plates 14 are somewhat longer than the plates 12 to prevent interference between the plates as the plates 14 are reciprocated and the plates 14 have wide rear depending flanges 62. U-shaped strips 64 of resilient material are fixed to the lower ends of the flanges 50 and 52 to provide a cushioned effect. The strips 64 may be composed of nylon, Teflon or other antifriction material, if desired.

During reciprocation of the drive frame 16, the wedges 47 travel along the grooved rollers 45. The bottoms of the wedges are parallel to the bases 56 and 68 of the plates 12 and 14 so that the travel of the drive frame is also parallel to the bases 56 and 68.

The flanges 50 and 52 preferably form slightly acute angles with bases 68 and 56, respectively, to provide good feeding and holding action of the articles 44 even when the plates 12 and 14 extend at substantial angles with the horizontal. The lefthand end plate 12 rests on a discharge chute 74 at the discharge end of the conveyor. While the conveyor of FIG. 1 is shown as level for advancing the articles horizontally for inspection, it also, of course, may be inclined either upwardly or downwardly to elevate or lower the articles wherever desired. The plates 12 and 14 may be removed from the conveyor merely by pulling them one after another off the rods 38 and 41 for cleaning or repair, and may be reconnected quickly in the conveyor merely by snapping the clips 39 and 40 back over the rods 38 and 41 starting, of course, at the lefthand end of the conveyor, as viewed in FIG. 3. While the clips 39 are shown as mounted in front of each flange 62, the clips also may be mounted at the backs of the flanges 62.

A grading conveyor (FIG. 7) forming an alternate embodiment of the invention is generally similar to the conveyor of FIG. 1 and includes a pair of side guide members 82, holding plates 84, 86, 88 and 90 mounted on rods 92 carried by the members 82. The holding plates are interleaved in a shingled pattern with pushing plates 94 reciprocated rectilinearly by drive frame 98 having wedges 100 resting on rollers 102 and driven by a drive (not shown) similar to the drive of the drive frame 16. The holding plates 84, 86, 88 and 90 have grading slots 104, 106, 108 and 110 of progressively increasing heights in the forward flanges thereof to permit progressively larger articles to roll through the slots and backwardly and downwardly along the tops of the pushing plates 94 and drop into containers (not shown) positioned to receive the articles of the several sizes. The heights of the slots 104, 106, 108 and 110 progressively increase starting with the slot 104 and proceeding to the slot 110, and, if desired, the width of each forward flange of the holding plates 84, 86, 88 and 90 can be progressively greater, proportionately to the increase in heights of the slots. The edges of the wedges engaging the rollers 102 are, of course, parallel to the bases or main portions of the plates 84, 86, 88, 90 and 94. In the holding plates 84, 86, 88 and 90, each forward flange has only two narrow, leg-like members positioned at opposite ends of the slot therein and also located at the side edges of the holding plate so that articles can pass through the slot for almost the entire length of the flange.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In a pusher conveyor,
a pair of parallel side guides,
a plurality of holding members,
means mounting the holding members in parallel positions between the side guides,
a plurality of pushing members interleaved with the holding members and slidable therebetween,
a drive member,
and quick-detachable means securing the rear ends of the pushing members to the drive member,
each of the quick-detachable means including snap-on clip means on the rear end portion of one of the pushing members and projection means on the drive member adapted to detachably interlock with the clip means.

2. In a pusher conveyor,
a pair of parallel side guides,
a plurality of parallel rods mounted in parallel positions extending between the side guides,
a plurality of holding plates,
a plurality of clips detachably connecting the holding plates to the rods,
a plurality of pushing plates,
a drive frame having a plurality of parallel rods,
and a plurality of clips detachably connecting the pushing plates to the rods of the drive frame.

3. The pusher conveyor of claim 2 wherein the drive frame is ladder-like and includes a pair of side bars carrying the rods of the drive frame and also includes a plurality of parallel wedges,
and guide means engaging the wedges.

4. In a pusher conveyor,
a plurality of generally L-shaped holding plates having base portions of a predetermined length and forward flanges,
side guide means,
first connecting means securing the rear end portions of the base portions of the holding plates pivotally to the side guide means at points spaced therealong,
means for supporting the forward end of the most forward one of the holding plates,
a plurality of generally U-shaped pushing plates having base portions longer than the base portions of the holding plates, forward flanges and rear flanges and interleaved with the holding plates with the forward flange of each pushing plate resting on the base portion of the holding plate ahead thereof and the forward flange of each holding plate except the most forward one of the holding plates resting on the base portion of one of the pushing plates,
a driver,
second connecting means securing the rear flanges of the pushing plates pivotally to the drive member,
and means for moving the drive member back and forth along the side guide means to move the pushing plates back and forth along the holding plates.

5. The pusher conveyor of claim 4 including a plurality of strips of low friction plastic material mounted on the edges of the forward flanges.

6. The pusher conveyor of claim 4 wherein the connecting means include quick-detachable clips and projections.

7. In a pusher conveyor,
a plurality of angular plates having interleaved base portions and forward flanges each resting on the base portion of the plate thereahead,
a pair of side guides bracketing the plates,
drive means movable back and forth relative to alternate ones of the plates,
quick-detachable means securing the other plates to the drive means,
and quick-detachable means securing said alternate ones of the plates to the side guides,
the drive means serving to move said other plates back and forth relative to said alternate ones of the plates.

8. In a pusher conveyor,
a pair of side guides,
a plurality of first mounting members carried by the side guides in positions spaced along the side guides,
a plurality of holding plates having forward flanges and base portions extending rearwardly from the forward flanges,
a plurality of pairs of spring clips detachably securing the base portions of the holding plates on the first mounting members, a plurality of pushing plates having forward flanges resting on the base portions of the holding plates and base portions extending rearwardly and supporting the forward flanges of the holding plates, a driving frame, means mounting the driving frame for back and forth movement beneath the plates, and a plurality of pairs of spring clips detachably securing the pushing plates to the driving frame.

References Cited by the Examiner

UNITED STATES PATENTS

| | | | |
|---|---|---|---|
| 1,428,290 | 9/1922 | Kevlin | 198—221 |
| 1,630,438 | 5/1927 | Layland | 198—218 |
| 1,913,804 | 6/1933 | Haseltine | 209—85 |
| 2,792,929 | 5/1957 | Magnuson | 198—218 |

HUGO O. SCHULZ, *Primary Examiner.*

EDWARD A. SROKA, SAMUEL F. COLEMAN,
*Examiners.*